No. 619,998. Patented Feb. 21, 1899.
S. E. SAUNDERS.
COMPOUND LUMBER.
(Application filed Sept. 6, 1898.)
(No Model.) 2 Sheets—Sheet 1.

Witnesses.
J. D. Kingsbury
B. W. Brackett

Inventor
Samuel E. Saunders
By Whitaker & Prevost Attys.

THE NORRIS PETERS CO., PHOTO-LITHO., WASHINGTON, D. C.

No. 619,998. Patented Feb. 21, 1899.
S. E. SAUNDERS.
COMPOUND LUMBER.
(Application filed Sept. 6, 1898.)

(No Model.) 2 Sheets—Sheet 2.

Witnesses. Inventor

UNITED STATES PATENT OFFICE.

SAMUEL EDGAR SAUNDERS, OF GORING-ON-THAMES, ENGLAND.

COMPOUND LUMBER.

SPECIFICATION forming part of Letters Patent No. 619,998, dated February 21, 1899.

Application filed September 6, 1898. Serial No. 690,299. (No model.)

*To all whom it may concern:*

Be it known that I, SAMUEL EDGAR SAUNDERS, a subject of the Queen of Great Britain, residing at Goring-on-Thames, England, have invented new and useful Improvements in Compound Lumber, (for which I have applied for a patent in Great Britain, No. 222, dated January 4, 1898,) of which the following is a specification.

My invention relates to the building of boats, carriages, panels, or other articles wherein a series of layers, veneers, or strips of wood or other material are laid crosswise or diagonally of each other and united together; and the object of my invention is to provide improved means for uniting these layers.

In carrying out my invention I place the several layers one upon another in the usual manner and temporarily secure them together, and then I form several series of registering holes, through which wire is threaded or laced, grooves being preferably formed between the several pairs of holes to receive the wire, so that the latter shall be flush with or below the exterior surfaces of the articles. The wires also serve for securing strips, battens, or the like to the surfaces, according to requirements, without the use of nails.

To enable my invention to be fully understood, I will describe the same by reference to the accompanying drawings, in which—

Figure 1:
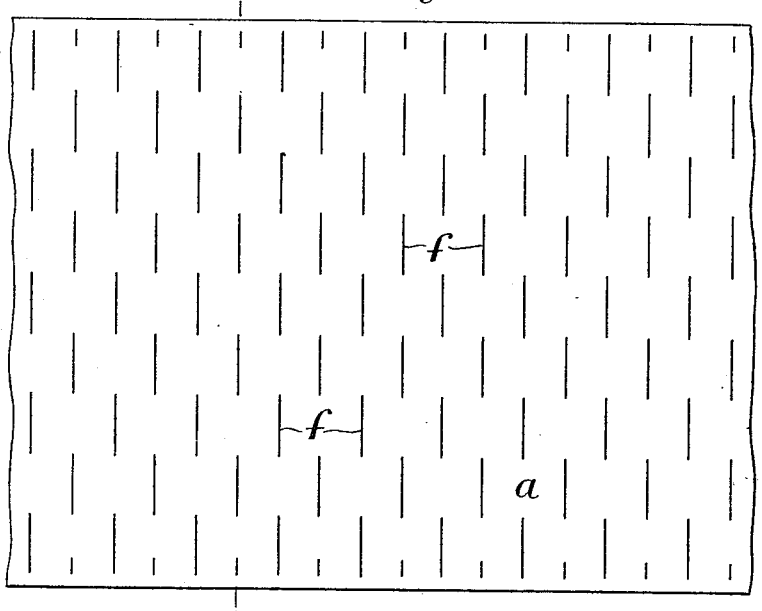
Figure 2:
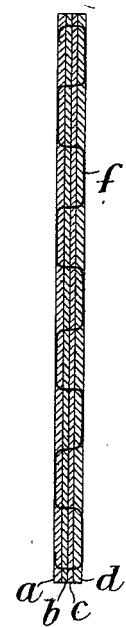
Figure 3:
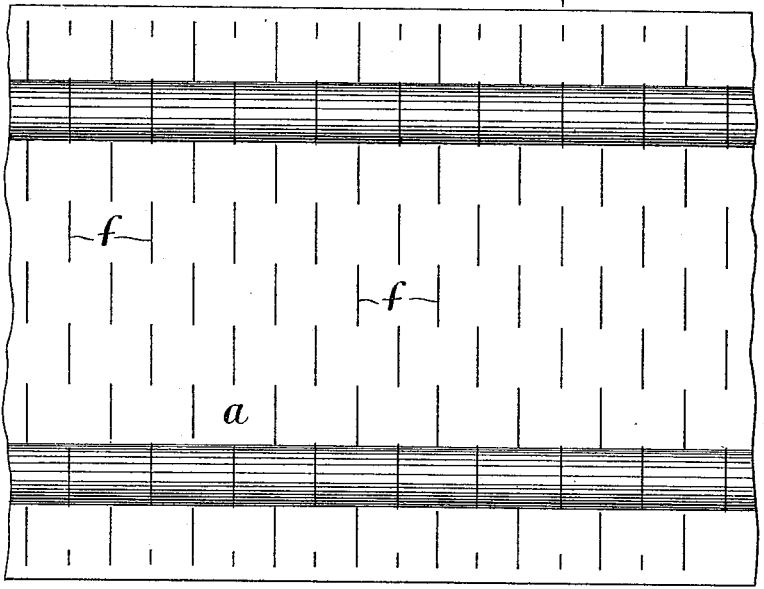
Figure 4:
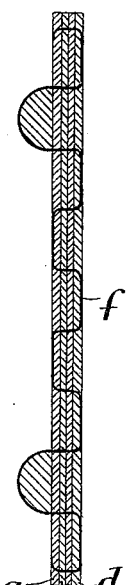
Figure 5:
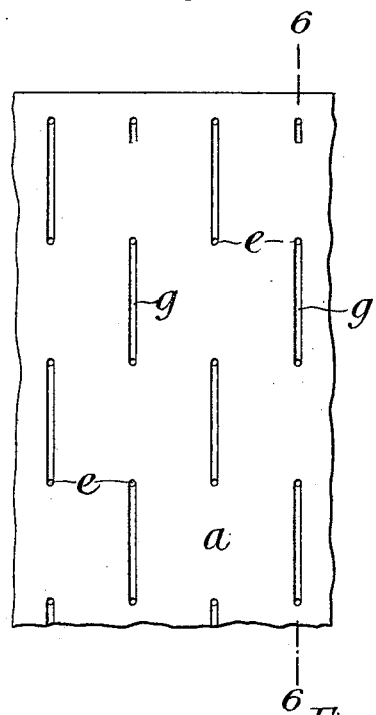
Figure 6:
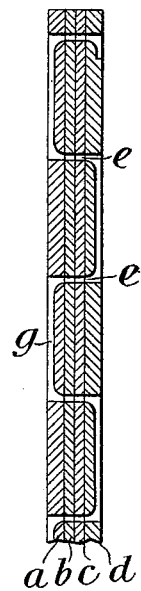
Figures 7, 8:
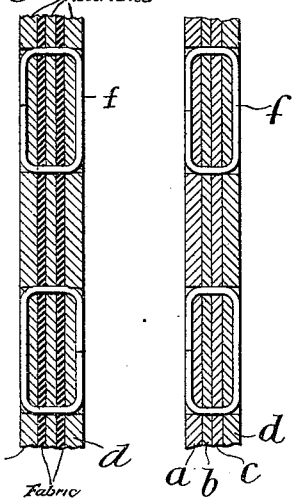

Figure 1 is a view in elevation illustrating my invention; and Fig. 2 is a section on the line 2 2, Fig. 1. Fig. 3 is a view similar to Fig. 1, but showing strips or battens secured upon one surface of the material; and Fig. 4 is a section on the line 4 4, Fig. 3. Fig. 5 is a view similar to Fig. 1, but showing the holes and grooves for the wires. Fig. 6 is a section on the line 6 6, Fig. 5; and Fig. 7 is a sectional view illustrating a slight modification. Fig. 8 is a sectional view showing waterproof fabric inserted between layers of veneer. Figs. 5, 6, 7, and 8 are drawn to a larger scale than Figs. 1 to 4.

*a b c d* indicate four layers of wood which are to be secured together in accordance with my invention, the said layers being arranged so that the grain of one layer crosses or is at an angle to the grain of the adjacent layer or layers. In some cases—for instance, when my invention is to be applied for the building of boats—I advantageously arrange between the layers of wood other layers of waterproofed canvas or other fabric. The several layers, having been temporarily secured together, have rows of registering holes *e e*, Figs. 5 and 6, formed through them, through which a copper or other wire can be threaded to secure the several layers together, as indicated in Fig. 2, grooves *g g* being formed between the pairs of holes at opposite sides of the combination-board or the like, in which the wire will lie so as to be flush with or below the external surfaces of the outer layers, the outer layers being in all cases wood.

In practice the rows of stitches are preferably arranged so that they are transverse to the grain of the outer layers, and the wires are so threaded that the wire loops of one row will alternate with the spaces between the wire loops of the adjacent row. Instead of using a continuous wire *f* short wires may be used—for instance, as shown in Fig. 7—the ends of the said wires being suitably connected together.

When strips, battens, or the like are to be secured to the surfaces, such battens are laid on before the wire binding is applied, and then the wire is passed over the said strips, as clearly indicated in Figs. 3 and 4.

In Fig. 8 I have shown three layers of wood veneer *a*, *b*, and *c*, with a layer *b'* of waterproof fabric between the veneer *b* and veneers *a* and *c*, the layers being united, as in Fig. 7.

My invention is of especial advantage in connection with launch-building, as I am enabled to obtain great strength with little weight and to dispense with the use of the usual ribs. I prefer when applying my invention for this purpose that the several layers of which the boat is composed should extend over as large a surface of the boat as possible and that they should be molded or set to conform to the shape of the boat during their application, so that when the several layers, which are temporarily united during their application, are permanently united according to my invention the boat will possess great rigidity; also, for most purposes it will be found advisable to unite the several layers after they have been shaped and placed in the position which they are to permanently occupy.

In some cases it will be found advisable that after the wire has been applied to bind the several layers together the grooves and holes should be filled with suitable putty or stopping and the whole surface then cleaned off to make it flat and even.

Although I have described my invention in connection with four layers of material, it is to be understood that a greater or less number of layers may be used according to requirement. The outer layers, however, should be of such thickness that the grooves $g\ g$, in which the wires lie, will not unduly weaken the material.

Having now particularly described and ascertained the nature of my said invention and in what manner the same is to be performed, I declare that what I claim is—

1. As an article of manufacture, a body composed of layers of thin material placed one upon the other having the outside layers of wood, said outer layers having throughout their entire extent apertures at intervals, and grooves connecting said apertures, and securing-wires passing through all of said layers and lying in said grooves and uniting said layers, substantially as described.

2. As an article of manufacture, a compound lumber composed of layers of thin material placed one upon the other with wooden layers upon the outside, said wooden layers having throughout their entire extent a series of rows of perforations, the perforation of one row alternating with those of the adjacent row or rows, grooves connecting the said apertures, and securing-wires passing through said apertures and all of said layers and lying in said grooves firmly uniting said layers, said wires extending transversely of the grain of the said outer layers, substantially as described.

SAMUEL EDGAR SAUNDERS.

Witnesses:
 G. F. REDFERN,
 G. F. TYSON.